United States Patent
Lee

(10) Patent No.: US 8,261,205 B2
(45) Date of Patent: Sep. 4, 2012

(54) USER INTERFACE FOR PRESENTING A LIST OF THUMBNAIL ITEMS ASSOCIATED WITH MEDIA ITEMS

(75) Inventor: Edgar Y Lee, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1061 days.

(21) Appl. No.: 11/772,764

(22) Filed: Jul. 2, 2007

(65) Prior Publication Data

US 2008/0298697 A1 Dec. 4, 2008

Related U.S. Application Data

(60) Provisional application No. 60/940,948, filed on May 30, 2007.

(51) Int. Cl.
*G06F 3/048* (2006.01)
*G09G 5/34* (2006.01)

(52) U.S. Cl. ........ 715/784; 715/825; 715/830; 715/838; 345/684

(58) Field of Classification Search .................. 715/784, 715/825, 830, 838; 348/231.1; 345/684
See application file for complete search history.

(56) References Cited

U.S. PATENT DOCUMENTS

| 5,659,729 | A | * | 8/1997 | Nielsen .................................. 1/1 |
| 6,020,920 | A | * | 2/2000 | Anderson .................. 348/222.1 |
| 7,426,696 | B1 | * | 9/2008 | Hwang et al. .................. 715/784 |
| 7,627,826 | B2 | * | 12/2009 | Pry .................................. 715/745 |
| 2005/0144221 | A1 | * | 6/2005 | Shin et al. ..................... 709/203 |
| 2005/0210414 | A1 | * | 9/2005 | Angiulo et al. ............... 715/838 |
| 2007/0013708 | A1 | * | 1/2007 | Barcklay et al. .............. 345/557 |
| 2007/0094280 | A1 | * | 4/2007 | Vartiainen et al. ............ 707/100 |
| 2007/0258695 | A1 | * | 11/2007 | Yoshikawa et al. ............ 386/46 |

* cited by examiner

*Primary Examiner* — Kieu Vu
*Assistant Examiner* — Blaine T. Basom

(57) ABSTRACT

A user interface allows a user to access media items by selecting from a list of thumbnail items associated with the media items. Various techniques are used to reduce the latency times when displaying the list of thumbnail items in the user interface. When the list is initially displayed, for example, the thumbnail items may be loaded into memory according to how far they are from a currently displayed portion of the list, rather than always starting from the top of the list. In addition, if not all of the thumbnail items can be loaded at one time, when the list window is scrolled, the thumbnail items relatively far from a current scroll position of the list are purged so that the items closer to the current scroll position may be loaded.

19 Claims, 4 Drawing Sheets

USER INTERFACE FOR PRESENTING A LIST OF THUMBNAIL ITEMS ASSOCIATED WITH MEDIA ITEMS

CROSS REFERENCE TO RELATED APPLICATIONS

This application claims the benefit of U.S. Provisional Application No. 60/940,948, filed May 30, 2007, which is incorporated by reference in its entirety.

BACKGROUND

Embodiments of the invention relate generally to user interfaces that provide a list of thumbnail items to allow a user to access media items associated with the thumbnail items, and in particular to memory management techniques for displaying the thumbnail items with low latency and improved user experience.

Various types of software applications allow users to access, interact with, and/or modify media items. The types of software applications that can be used to access media items depend on the types of media items being accessed, which may include, without limitation, still images, videos, audio content, textual content, games and other software programs, and any combinations thereof. An image viewer application is one example of a software application that allows users to browse still images (and possibly other types of media, including videos). The image viewer may also allow a user to perform basic editing tasks on the images or other media being viewed. Other examples include media players that allow users to view or play media content, such as videos and music files, and web browsers that allow users to view web pages and access media content contained on the web page.

The media content that can be accessed may include a large number of media items from one or more sources. For example, an image viewer may be used to view still images from various digital photo albums, each of which may include hundreds (or more) still images. The user interfaces for presenting these items typically also include some mechanism to allow a user to select a particular one or more items to view and/or edit. In the image viewer application context, for example, a thumbnail image (or simply, "thumbnail") for each of the images may be presented in a list of thumbnails. A user can scroll the list of thumbnails and select a thumbnail from the list, which may then cause the image viewer application to show the associated image in its full form. Similar user interfaces exist for the other types of media items, where a particular media item (e.g., an image) can be selected by selecting its corresponding thumbnail item (e.g., a thumbnail image). Another common example is a web page that displays thumbnail images, which can be selected (e.g., by clicking on the thumbnail) to bring up the image, video, or other content associated with the thumbnail.

The interfaces described above are intuitive and helpful for many applications, but the hardware limitations of the devices on which they run can result in undesirable delays for the user. Such hardware limitations may include device memory, processing power, and network bandwidth. For example, existing image viewer applications load thumbnails in temporal order from a top position to a bottom position in the list, and this list may include many more thumbnails than can be displayed on the screen at any one time. If the application opens the list of thumbnail items at a position other than the top of the list, the user will have to wait for thumbnail items above to load into memory before the user will be shown the selected or "current" thumbnail item. This latency, which can be significant depending on the size of the list and the capabilities of the device, is undesirable for the user.

In addition, due to memory limitations of the device and/or the amount of memory allocated to the image viewer application, the device may not be able to load all of the thumbnail images into its memory. The application must then decide which thumbnails to purge when new ones are to be loaded. Existing applications do not employ any kind of intelligent technique to select which thumbnails to purge, and they likely load and purge using a simple first-in-first-out (FIFO) technique. But this does not account for the likely next actions by the user, who is likely scroll the list of thumbnails from a current position in one direction or the other. If the user has been scrolling down the list, the thumbnails above the current location may be loaded into memory, whereas the thumbnails below this position may not be. Accordingly, if the user continues to scroll down the list, the user will have to wait as the device loads the new thumbnails into memory before they are displayed in the list. The result is that thumbnail items relatively far from the current scroll position in the list are loaded into memory while thumbnail items relatively close to the current scroll position are not. This, too, results in a user experience with an undesirable latency, as the user must wait while the thumbnail items are loaded into memory.

Because the loading and processing of thumbnail items—as well as the media items themselves—can lead to significant latencies (especially when compressed formats such as JPEG are used), strategies are needed to deal with these latencies and with the resource limitations of the device on which the media application is run.

SUMMARY

By employing intelligent algorithms to load and purge data, embodiments of the invention present a much more responsive user experience than existing systems. For example, the thumbnail items in a list of thumbnail items may be loaded into and purged from memory based, at least in part, on the likelihood that the thumbnail items will need to be displayed in the user interface. As a proxy for determining whether a thumbnail item is likely to need to be displayed, embodiments of the invention may use the distance in the list of thumbnail items that a particular item is from those items currently being displayed by the user interface.

In one embodiment, the thumbnail items are loaded into memory according to how far they are from a currently displayed portion of the list. For example, when the user interface is opened to a position that is not at the top of the list of thumbnails, the thumbnail items associated with a current position in the list are loaded first, and the other thumbnail items in the list are then loaded based on their proximity from the current position (e.g., both upwards and downwards). In this way, the user need not wait to see the current thumbnail image while the thumbnails above are being loaded, and the user can scroll in either direction immediately to see the adjacent thumbnails. This process may be implemented in a thread running on the device that is separate from a main thread.

In another embodiment, the media application may not be able to load all of the thumbnails in memory due to limitations in the memory allocated or otherwise available for this purpose. Therefore, the application must decide which thumbnails to purge when new ones are to be loaded (i.e., when the user scrolls down the list). The application attempts to load the thumbnails that are adjacent to the currently viewed item, since those will most likely be viewed next. The application thus purges from the memory the thumbnails for items that are furthest from the currently viewed item, as these are the least likely to be viewed. This process may be implemented in a thread running on the device that is separate from a main thread.

Embodiments of the user interface described herein may be provided for a media application that is designed to run on a computing device having limited resources, such as memory. Computing devices with limited resources may include portable computing devices and communication devices, such as cellular phones.

In one embodiment, the media application is an image viewer application, the media items are still images and/or videos, and the thumbnail items are thumbnail images representative of the still images or videos. Additionally, embodiments of the invention may use the loading and purging techniques described for the thumbnail items for loading and purging of the associated media items as well.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments of the invention are directed to a user interface that allows a user to access media items by selecting from a list of thumbnail items associated with the media items. Various techniques are disclosed to address the problem of how to load the thumbnail items into memory so they can be displayed by the user interface without making the user wait a long time to see them. To avoid this problem, thumbnail items may be loaded based on how likely they are to be needed, and loaded thumbnail items may be purged from memory when it is less likely that they will be needed. How likely the thumbnail images are to be needed are measured, in one embodiment, based at least in part on how far the items are in a list from the items currently being displayed. The items currently being displayed may be defined by a single item (e.g., a "current" item), or by a set of items that are in a visible or displayed portion of the list. These techniques are thus directed at reducing the latency times when displaying the list of thumbnail items in the user interface.

For simplicity and explanation purposes, various embodiments of the invention are presented below in the context of an image viewer media application; however, it will be appreciated that the techniques described herein may be used for other types of media applications. In addition, although specific user interfaces are shown in the figures and referred to in the discussion, it can be appreciated that various other user interfaces with different configurations and formats can be used in connection with embodiments of the techniques described. Accordingly, the embodiments described herein can be applied broadly to media applications in which a list of thumbnail items are used to select from among a set of media items.

Image Viewer Application Example

Figure 1:
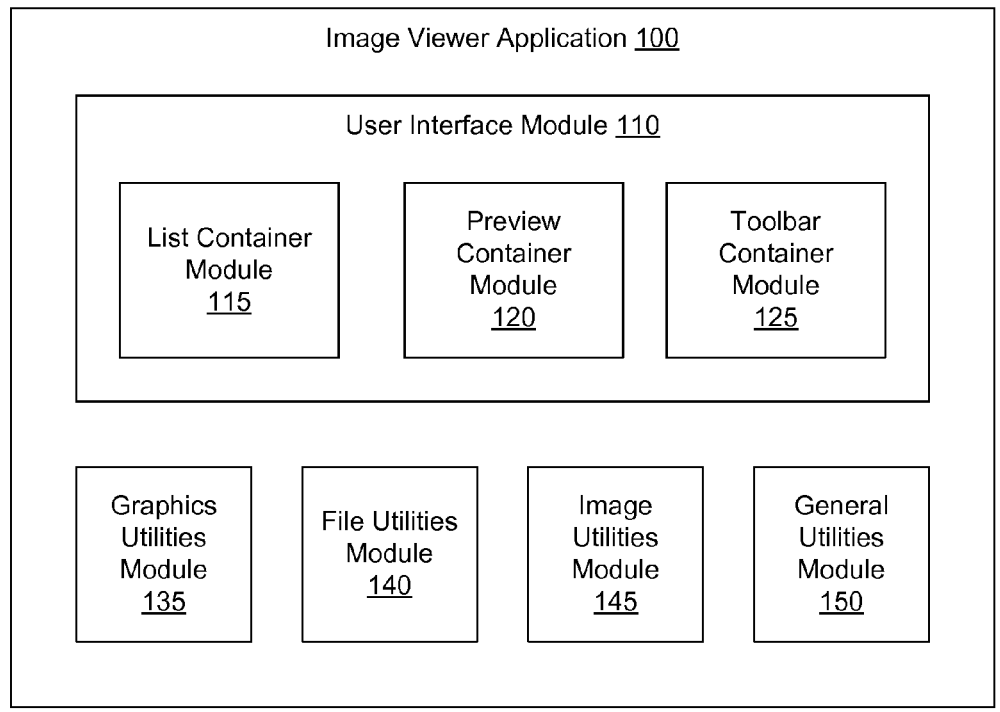
FIG. 1 is a block diagram of an image viewer media application, in accordance with an embodiment of the invention.

FIG. 1 is a block diagram of an example image viewer application 100. An image viewer is a software application that allows users to browse still images (and possibly other types of media, including videos). The image viewer may also allow a user to perform basic editing tasks on the images or other media being viewed.

The image viewer application 100 comprises a user interface module 110, which comprises a number of container modules for the main interface components of a user interface for the application 100. In this embodiment, the user interface module 110 comprises a list container module 115, a preview container module 120, and a toolbar container module 125. These container modules are described in more detail below in connection with the user interface view of FIG. 2. In addition to these user interface container modules, the application 100 may comprise one or more different utility functions for managing the content of the container modules. In this embodiment, the user interface module 110 comprises a graphics utilities module 135, a file utilities module 140, an image utilities module 145, and a general utilities module 150.

The graphics utilities module 135 may contain one or more helper functions for using the drawing primitives and may also include functions that deal with various other graphics functionalities, depending on the type of application 100. In addition, the graphics utilities module 135 may include several functions for converting graphics from one format to another.

The file utilities module 140 contains functions for scanning a specific directory for any supported still image formats. The scan may or may not be recursive so that more than the current directory level is analyzed. In one embodiment, the file utilities module 140 does not load any actual image data. Instead it builds an array of all the file property information (e.g., pathname, file size, modification date, and the like) for the images found. This information is then used to build a quick picture of the directory structure when first entering a folder. As will be explained in more detail below, separate threads may be used to load and display the actual thumbnail items.

The image utilities module 145 contains a set of functions for managing the image data. These functions are responsible for loading the full-size image used by the preview window 220 (described below) and for generating and caching the thumbnail items. For example, image files may be used for cached thumbnails stored on a local file system and also for an email application (also described below).

The thumbnail 215 can be loaded in a number of ways. If a thumbnail image already exists, it can be obtained from memory; otherwise, it can be created using the full image. For example, when a thumbnail 215 is requested for a media item 225, the application 100 may check the local cache to see if one is available or retrieve it from the file. If the latter, the application 100 may first check meta data related to the image (e.g., the file's EXIF data), and if no thumbnail is found or if the thumbnail is not valid (e.g., if too small or out of date), a thumbnail is created from the full-size image. Once the thumbnail is created, it is saved in the local cache so that it need not be generated again.

The general utilities module 150 contains string-related helper functions. Some examples are functions for returning the containing folder name for a given path, stripping the extension from a filename or pathname, and building a string from a file size value. There are also functions for checking for low memory conditions and searching the array of image items. Helper functions that do not fall under the other categories may also be included with the general utilities module 150.

Figure 2:
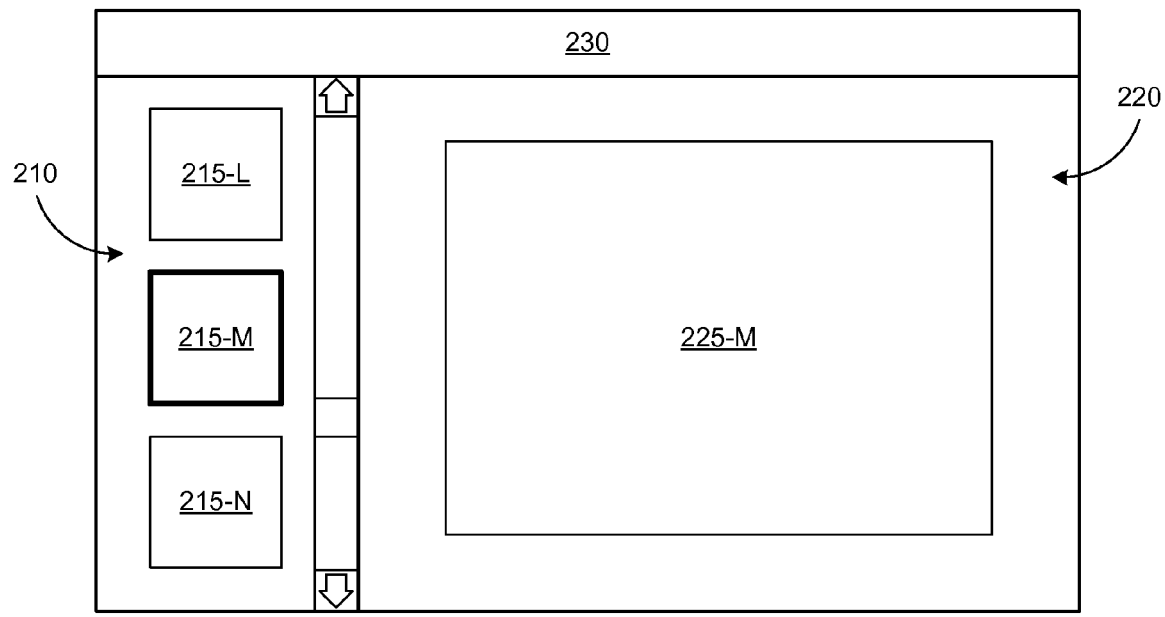
FIG. 2 is an example screen shot of the image viewer application of FIG. 1.

FIG. 2 is an example screen shot of a user interface presented by this application 100. The user interface includes a list window 210, a preview window 220, and a toolbar 230. The list window 210 includes a number of thumbnails 215; however, the list window 210 typically does not have enough area to display or make visible all of the thumbnail items 210 contained therein. Accordingly, the list window 210 is scrollable to allow a user to access any particular thumbnail 215. As shown, for example, the list window 210 is scrolled to a scroll position in which thumbnails 215-L, 215-M, and 215-N are visible. In this example screen shot, thumbnail 215-M is selected, so the preview window 220 is currently showing the corresponding full image 225-M.

The list window 210 contains thumbnail items 215 that allow a user to access the media items (e.g., images) in the selected directory. In one embedment, the list window 210 comprises a table of items, where each item represents either an image file or a folder that may contain image files. Each thumbnail item 215 may be drawn with as an icon along with the filename of the associated image file (and the file extension may not be drawn, if the file type is assumed). The list window 210 may be configured to display only those file types that are supported by the application 100, as well as folders. If a directory contains other file types, such as a text file, for example, these types may be filtered from the list window 210.

The list window 210 may be presented in a variety of view for displaying the items. For example, the views may include: an icon view, a tile view, and a list view. The views may all behave the same in terms of selection and focus for items in the list; however, the views may differ in the layout of the items, the size of the thumbnails, and the text that accompanies each item. For example, the icon view may comprise a grid of items, where each item is displayed with a thumbnail representing its image and text for its filename. Similar to the icon view, the tile view may comprise a grid of items, but in addition to the icon and filename, each item may be displayed with its file type, file modification date, file size, image dimensions, and/or any other meta data about the item. The list view may display the items in a list format, with columns (e.g., name, size, type, and date modified), which may further be sortable via clicking on a column header.

From the list window 210, a user can select one or more thumbnail items 210 that are displayed. A user may wish to select multiple thumbnail items 210 when deleting, rotating, or emailing more than one thumbnail item 210 at a time. To select a single thumbnail item 210, the user may simply click on it. If the user selects a new thumbnail item 210, the selection then moves to the new thumbnail item 210 and the previously selected thumbnail item 210 is no longer selected. The user may also change the selection by using the arrow keys or a cursor. To select multiple thumbnail items 210, the user may hold down either the <Shift> or <Alt> keys to select a continuous or discontinuous set of items, respectively.

The preview window 220 is a portion of the user interface that shows a large preview of the media item 225, which in this case is an image. The displayed media item 225 may be the full version, or it may be a scaled version to accommodate the user interface layout. In one embodiment, the entire image 215 is loaded into memory and scaled to the bounds of the container module. The preview window 220 can be displayed in any view. As the user changes focus in the list window 210, e.g., by selecting a different thumbnail item 215, the preview window 220 updates to display the new corresponding media item 225.

Since the media items 225 may take a few seconds to load, in one embodiment, a thumbnail 215 of a newly selected media item 225 may be drawn until the full image for the media item 225 is loaded and displayed. In one embodiment, when advancing to the next or previous media item 225, until the image is ready to be displayed, its thumbnail 215 is used in its place as the displayed image in the preview window 220. In one embodiment, rather that just drawing a single thumbnail 215, a filmstrip-like interface is displayed showing the current thumbnail 215 and its neighboring thumbnails 215. As the user cycles through the thumbnails 215, the filmstrip appears to advance frames, and after a period of time (e.g., a half second) of no user activity, the full-size version of the current item is then displayed.

The preview window 220 may further display a title bar above the image 225 to present additional information about it, such as a file name, size, and image resolution. The preview window 220 may also include buttons or other controls for advancing to the next or previous media item.

In one embodiment, when the user moves the cursor over the preview window 220, a tools panel appears. The tools panel may include various buttons for operating on or using the displayed image 225. Using the tools panel, for example, the user can click one of the buttons to perform an action on the current item, such as rotating the current image 90 degrees clockwise or counter-clockwise, deleting the image, or emailing the image. Various other functions may also be provided.

The toolbar 230 appears at the top of the user interface and can be used to navigate to various directories. By default, the toolbar 230 is visible in all the views, but the user may hide it via a menu option. During a full screen mode, for example, the toolbar 230, as well as an application bar, may be hidden so that the preview window 220 can fill the entire screen and maximize the space. The toolbar 230 may include a directory field that shows the path of the directory that is being currently viewed and allows the user to change this path. The toolbar 230 may also contain some basic information about the current directory's contents (e.g., the total number of items in the directory, the total file size of all the items, and the number of items currently selected).

Application Flow

Figure 3:
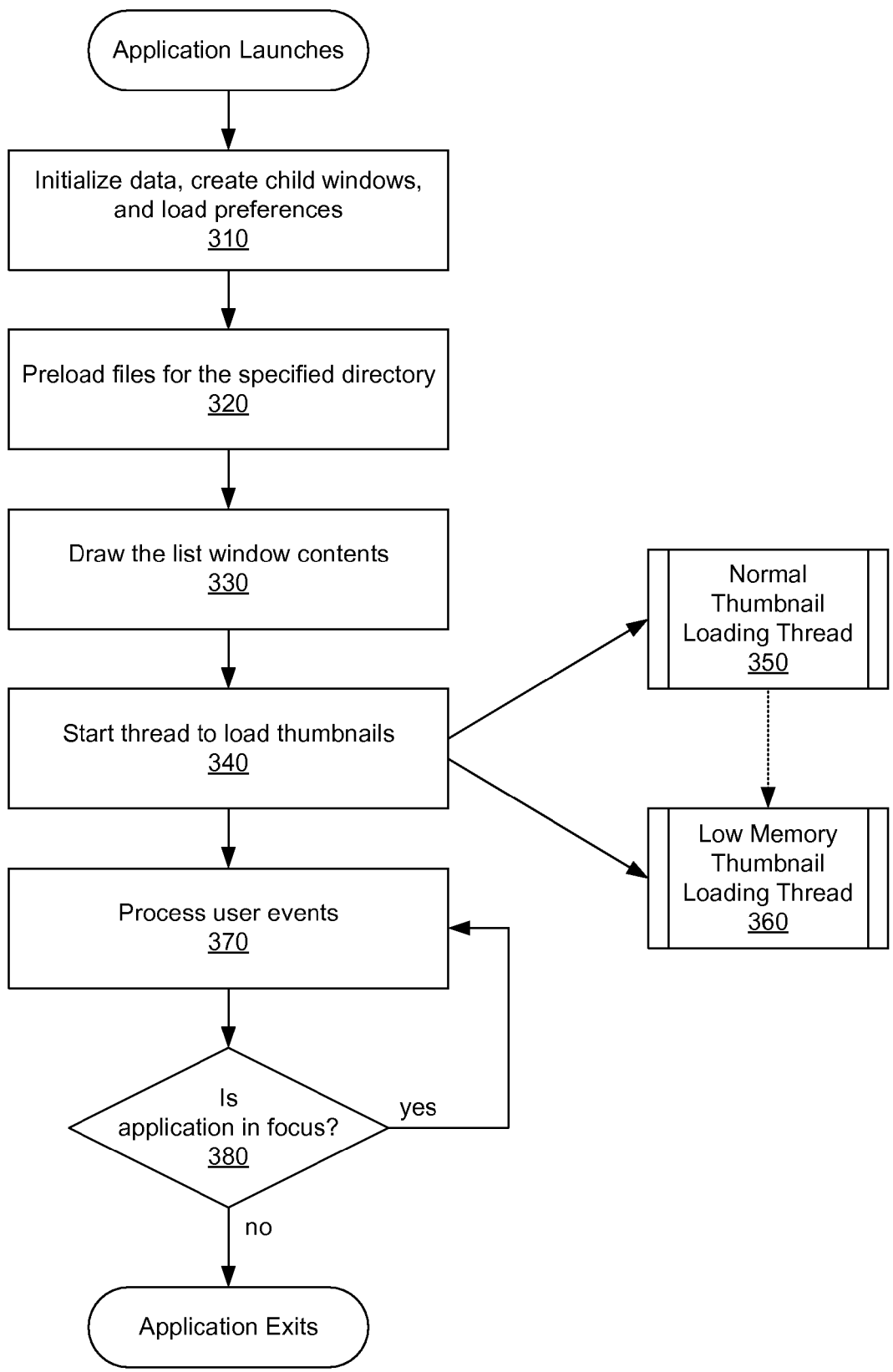
FIG. 3 is a flow diagram of the process flow of a media application, in accordance with an embodiment of the invention.

FIG. 3 illustrates an example application flow for an image viewer application 100 that uses various embodiments of the invention described herein.

When the application 100 first launches, the list 210 of thumbnails 215 may be opened at a position other than the top of the list 210. For example, the user may have linked to a position in the list 210, such as to a particular thumbnail 215, so the application 100 is launched with the list 210 scrolled to a different position than the top. In another embodiment, the device may allow the user to switch out of and back into the application 100 at any time, but due to memory requirements the device may require that the thumbnails 215 in the memory be emptied. In such an embodiment, the current state may be saved before the application 100 loses focus. This may be done by saving various pieces of information then rebuilding the view at the next application launch, such as an index of the currently selected item; the number of items in the list; and a list scrollbar position. This information can be used to rebuild the last scroll and selection state of the list window 210.

When the application 100 launches it performs several initialization steps 310. For example, the application 100 initializes 310 the user interface toolkit and sets up all the callbacks and listeners, initializes the global application data, loads the preferences and resources, and creates the various container modules. Once this is complete, the application 100 sends a message to preload 320 the items in the current folder (which may be any default directory for obtaining the media items). The preloading step 320 may involve analyzing the folder and building an array of the files that match the supported image formats.

The application then draws 330 the window contents, including the list window 210, the preview window 220, and the toolbar 230. So that the window contents can be drawn as quickly as possible, the thumbnail items 215 may not be loaded at this time. To load the thumbnails 215 in the list window 210, in one embodiment, the application 100 starts 340 a new thread separate from the main thread. In one embodiment, the application 100 attempts to load all of the thumbnails 215 into memory, so the application 100 starts the normal thumbnail loading thread 350, which is described in more detail below. In another embodiment, the application does not attempt to load all of the thumbnails 215 into memory, so the application 100 starts the low memory thumbnail loading thread 360, which is described in more detail below. The normal thumbnail loading thread 350 may itself launch the low memory thumbnail loading thread 360 if it runs out of memory, as explained below.

With either thread 350 or 360 running, the main application thread may continue and process 370 any user events, such as user selections of a particular thumbnail 215 to display the corresponding media item 225. This processing 370 of user events continues while the application 100 is in focus, and if 380 the application 100 is no longer in focus, the main application thread exits. The use of separate threads for the main application and thumbnail loading, as described for an embodiment, helps to handle the time-intensive tasks and improves the application's performance and the overall user experience.

Normal Thumbnail Loading Thread

Figure 4:
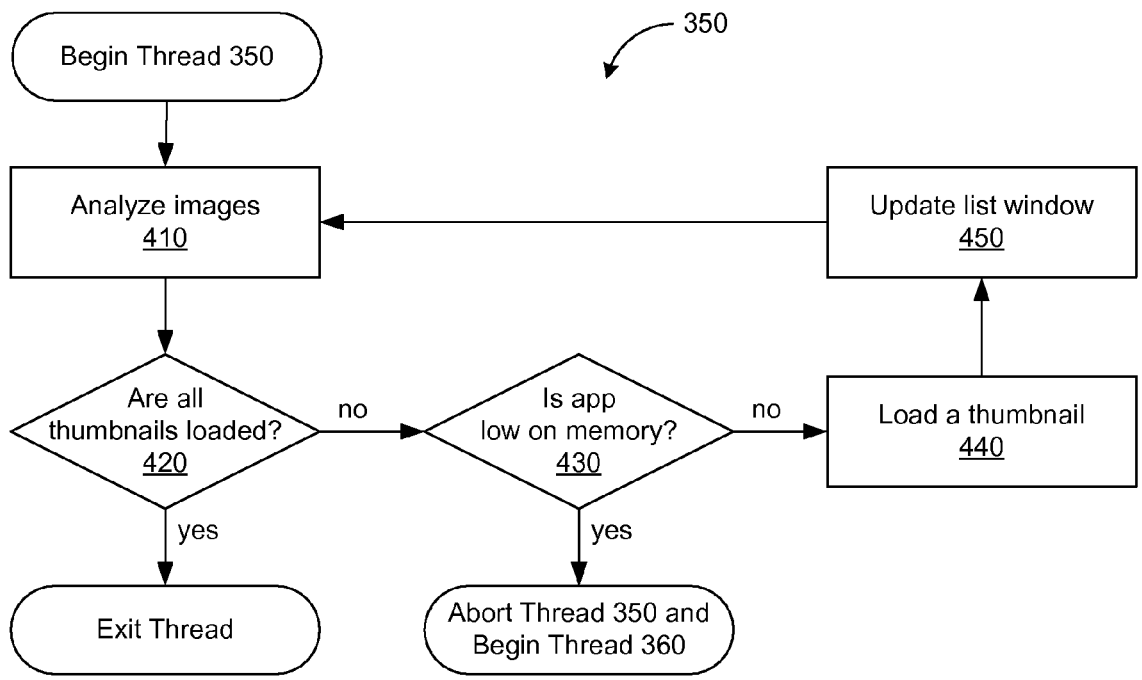
FIG. 4 is a flow diagram of a normal thumbnail loading thread 350 for the process of FIG. 3, in accordance with an embodiment of the invention.

An embodiment of the normal thumbnail loading thread 350 is illustrated in FIG. 4. In this thread 350, the contents are loaded into memory fully, if possible, in an order based on their proximity to the currently viewed set of thumbnail items.

The normal thumbnail loading thread 350 is created and launched after the application 100 finishes preloading the files in the folder. This thread 350 is responsible for loading and creating all the thumbnails for each item in the list. The thread 350 begins by analyzing 410 the media items (e.g., images) in a designated folder or other location in a storage. If 420 all of the thumbnails are loaded, the task is completed and the thread 350 may then terminate. Otherwise, the thread will attempt to 440 a thumbnail 215 into the memory, update 450 the list window 210, and then repeat the cycle until all of the thumbnails 215 are loaded.

However, this thread 350 may terminate prematurely if 430 the application 100 is low on memory (or, e.g., if the user switches to another folder such that the thumbnails in the previous folder no longer need to be loaded). During the thumbnail loading, the thread 350 will constantly check the amount of available free memory. If the amount of free memory goes below a certain threshold, the thread 350 will start the low memory thumbnail loading thread 360 and then abort itself. As described in more detail below, rather than trying to load the thumbnails 215 for all the items, the low memory thread 360 just attempts to load the thumbnails 215 that are currently visible in the list window 210 and possibly adjacent thumbnails 215, which are likely to be needed for the list window 210 next.

Figure 5:
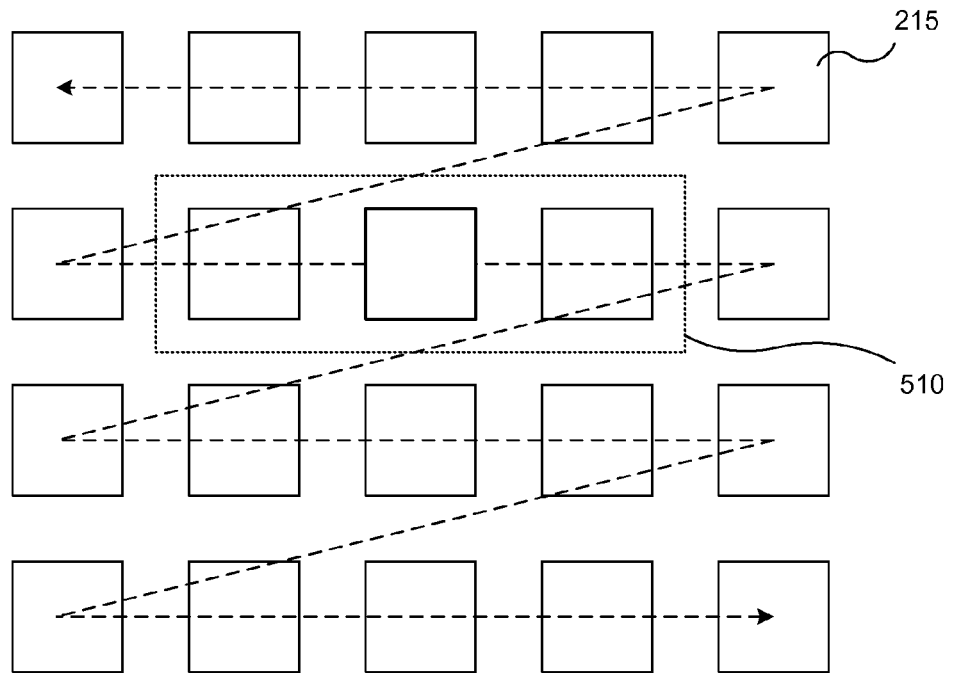
FIG. 5 is a diagram showing an example loading scheme employed by the normal thumbnail loading thread 350.

FIG. 5 illustrates the order in which the thread 350 performs the loading step 440. When requesting a thumbnail 215, the thread 350 will start at a current scroll position associated with the list window 210. This current scroll position may be defined according to a particular thumbnail 215 that is selected, or it may be defined according to one or more thumbnails 215 that are being displayed in a visible portion of the list window 215, shown in FIG. 5 with the outline 510. The thread 350 first attempts to load 440 the thumbnails at or near the current scroll position, unless already loaded, and then the thread 350 works outwards from the current scroll position in the list window 210. This allows the items visible within the list to update as quickly as possible with thumbnails 215. It also quickly populates the neighboring thumbnails 215, which are more likely to be viewed next due to a scrolling of the list window 210 by the user.

The priority for this thread 350, may be set to a level that is relatively low, such as below that of the main application thread. This allows the user interface to still be fairly responsive even though thumbnails 215 are being generated in the background.

Low Memory Thumbnail Loading Thread

The low memory thumbnail loading thread 360 may be initiated by the application or by the normal thumbnail loading thread 350 (e.g., upon reaching a low memory condition during normal loading). The low memory thread 360 may be selected, for example, if the memory allocated for the thumbnails 215 runs out before all of the thumbnails 215 have been loaded. In this case, when the list window 210 is scrolled, the thumbnails 215 that are relatively far from the current scroll position of the list 210 are purged so that the thumbnails 215 that are closer to the current scroll position may be loaded.

Figure 6:
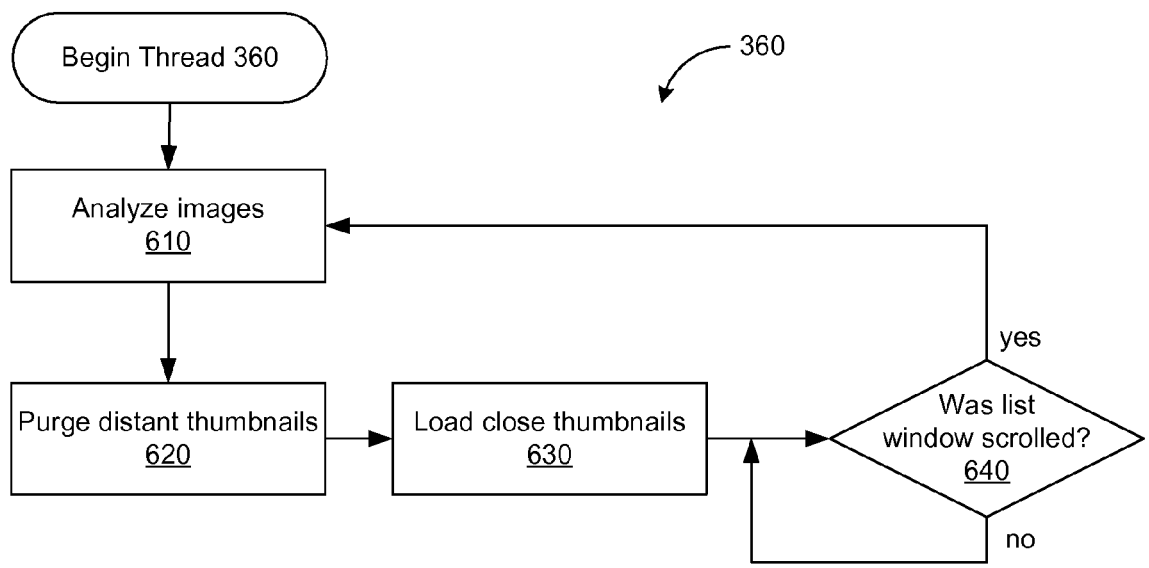
FIG. 6 is a flow diagram of a low memory thumbnail loading thread 360 for the process of FIG. 3, in accordance with an embodiment of the invention.

Illustrated in FIG. 6, the thread 360 begins by analyzing 610 the media items (e.g., images) in a designated folder or other location in a storage. Based on the current scroll position of the list window 210, as described above, the thread 350 then purges 620 certain thumbnails 215 so that it can then load 630 other thumbnails 215. In this way, the thread 360 can ensure that an optimal subset of the thumbnails 215 are loading into the memory based on the location of the current scroll position. For example, the thumbnails that are selected to be purged from the memory may be the ones farthest in the list 210 from the thumbnails 215 currently displayed in the list 210. Conversely, the thumbnails 215 selected to be loaded into memory are the thumbnails 215 closest in the list 210 to the currently displayed thumbnails 215. (It can be appreciated that the distance to the current scroll position is affected by whether the scrolling can wrap from the bottom to the top of the list 210.).

This purging of distant thumbnails 215 makes room for closer thumbnails 215, which are more likely to be subsequently accessed. The thumbnails 215 that are loaded in the memory are preferably those adjacent or otherwise close to the thumbnails 215 at the current scroll position, so that these thumbnails 215 will be already loaded into the memory if needed due to a likely user command to scroll the list window 210. The criterion of distance from the currently displayed thumbnails may be the only one or one of many for selecting which thumbnail items to purge and which to load.

Once the thumbnails 215 are purged and loaded as desired, the thread 360 waits until the list window 210 is scrolled, thereby changing the current scroll position. If 640 the window 210 is scrolled, the thread 360 then repeats as described above to maintain the desired thumbnails 215 loaded into the memory according to the low memory algorithm. In this way, as the set of thumbnails 215 being displayed in the list window 210 changes, selected thumbnails 215 in the memory are purged and new thumbnails 215 are loaded to maintain an optimal set of loaded thumbnails 215.

This thread 360 may continue until the user either leaves the folder or quits the application 100. Alternatively, the thread 360 may continually check the memory available and, as long as the memory is low, continue to run in the background. If all of the thumbnails 215 are loaded, the thread 360 may terminate as well.

Figure 7:
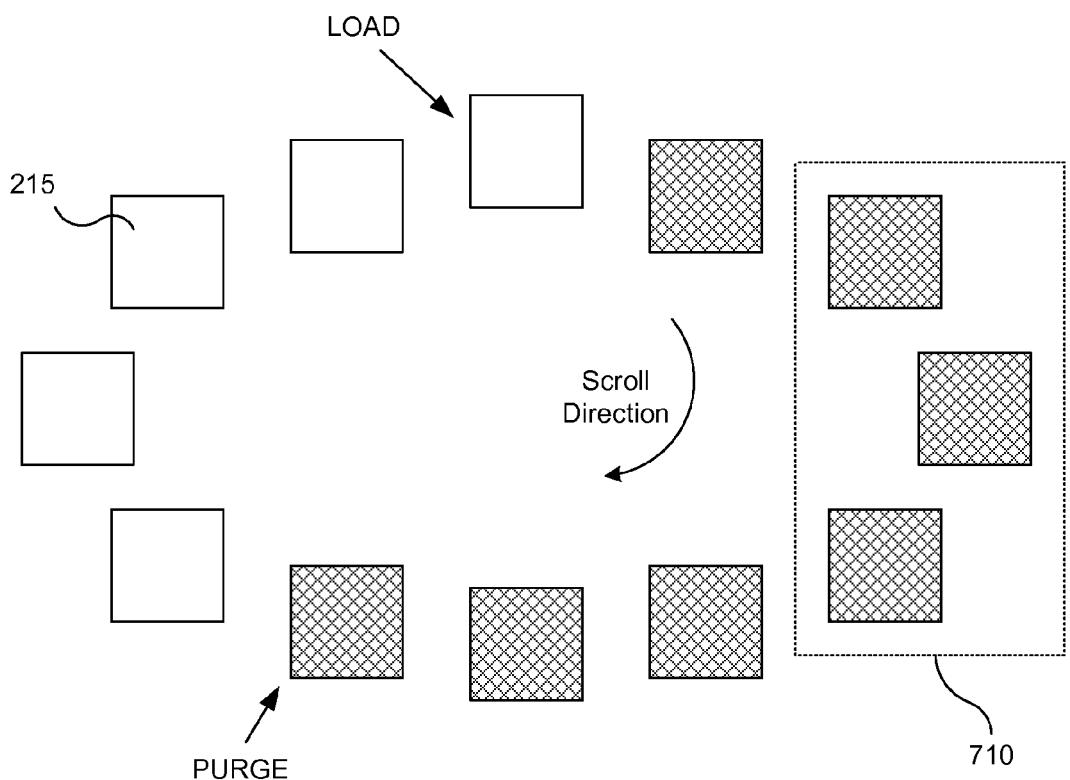
FIG. 7 is a diagram showing an example loading scheme employed by the low memory thumbnail loading thread 360.

An example of the low memory thumbnail loading thread 360 is illustrated in FIG. 7, in which the thumbnails 215 that are loaded into memory are depicted as shaded and the thumbnails 215 not loaded are not shaded. In this example, the memory can hold seven of the twelve total thumbnails 215. Outline 710 depicts the visible contents of the list window 210, in which three of the loaded thumbnails 215 are displayed.

FIG. 7 illustrates the state of the list window 210 just after the list window 210 has just been scrolled in the clockwise direction by one thumbnail 215. As a result of this action, only one thumbnail 215 above the current scroll position is loaded in memory, whereas three thumbnails 215 below it are. As shown in FIG. 6, the scrolling action causes the purging 620 and loading 630 steps of the thread 360 to be invoked. In this example, the thread 360 purges 620 the thumbnail 215 that is farthest from the current scroll position to allow loading of a thumbnail 215 that is closer, as shown in the figure. The result with be that two thumbnails 215 are loaded in memory both above and below the current scroll position, thereby allowing the user to scroll two spaces in either direction without having to wait for the application 100 to load a new thumbnail 215 into memory.

In various embodiments, the algorithm need not strictly force all thumbnails 215 farther from the current scroll position to be purged in favor of closer thumbnails 215. For example, there may be a tradeoff between the additional processing required to purge and load versus the benefit of a strictly enforced ideal loading profile such that the application 100 may wait for the loading to become more unbalanced before invoking the purging and loading processes. Other modifications to the basic algorithm are also possible.

Full-Sized Image Loading Thread

Another separate thread may be used for loading the full-size version of the images in the preview window 220. As explained above, the use of separate threads may improve the user experience, and this thread may be set with a low priority as well to allow the main application thread to run smoothly while the image loads in the background. By loading the image in the preview window 220 in the background, the user can still navigate freely in the application 100 while the image is loading. For example, in a situation where the user double-clicks an item to see the full-size version, and then the user decides to go back to the thumbnail list view. If the loading of the image were done in the main thread in a synchronous manner, the user would have to wait for the entire image to load before returning to the list. But by moving the full-size image loading processing into a separate thread, the user does not have to wait. The user will immediately return to the list and the thread will eventually terminate in the background once the image is done processing.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, firmware, or the like.

Accordingly, any of the steps, operations, or processes described herein may be performed or implemented with one or more hardware or software modules, alone or in combination with other devices. A hardware module comprises hardware components configured to perform any or all of the steps, operations, or processes described. A software module comprises a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. The computer program may be stored in a tangible computer readable storage medium or any type of media suitable for storing electronic instructions. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. Accordingly, the disclosure of the embodiments of the invention is intended to be illustrative, but not limiting, of the scope of the invention, which is set forth in the following claims.

What is claimed is:

1. A non-transitory computer-readable medium that stores instructions that when executed by one or more processors, cause the one or more processors to perform operations comprising:

identifying a current scroll position in a list of thumbnail items;

performing a normal loading operation to load at least some of the thumbnail items into a memory, including (i) loading one or more thumbnail items associated with the current scroll position, (ii) continuously loading additional thumbnail items for both sides of the current scroll position in order of their displayed proximity to the current scroll position, so that thumbnail items that are to be displayed closest to the current scroll position are loaded first and thumbnail items that are to be displayed furthest from the current scroll position are loaded last, and (iii) while continuously loading, periodically determining whether an amount of memory that is available is below a threshold;

in response to determining that the amount of memory that is available is below the threshold, terminating the normal loading operation and performing a low-memory loading operation, the low-memory operation including (i) continuously loading additional thumbnail items for both sides of the current scroll position while removing one or more loaded thumbnail items from the memory that are displayed furthest from the current scroll position, (ii) in response to receiving user input to change the current scroll position, removing loaded thumbnail images that are displayed furthest from the changed current scroll position while loading additional thumbnail items for both sides of the changed current scroll position; and displaying at least some of the thumbnail items as they are loaded into the memory.

2. The computer program product of claim 1, wherein the computer-readable medium further stores instructions for:
displaying a media item that corresponds to a selected thumbnail item in a preview window.

3. The computer program product of claim 1, wherein the current scroll position comprises an index associated with a thumbnail item in the list.

4. The computer program product of claim 1, wherein the current scroll position identifies a subset of the thumbnail items that are to be displayed in the list window.

5. The computer program product of claim 1, wherein the current scroll position is received in response to linking to one of the media items.

6. The computer program product of claim 1, wherein the current scroll position is received as part of state information saved from a previous use of the computer program product.

7. The computer program product of claim 1, wherein each media item comprises an image, and each corresponding thumbnail item comprises a lower resolution thumbnail image that corresponds to the image.

8. An electronic computing device comprising:
a memory;
a display;
a processor coupled to the memory and the display, the processor to:
identify a current scroll position in a list of thumbnail items that is presented on the display,
perform a normal loading operation to load at least some of the thumbnail items into the memory, including (i) loading one or more thumbnail items associated with the current scroll position, (ii) continuously loading additional thumbnail items for both sides of the current scroll position in order of their displayed proximity to the current scroll position, so that thumbnail items that are to be displayed closest to the current scroll position are loaded first and thumbnail items that are to be displayed furthest from the current scroll position are loaded last, and (iii) while continuously loading, periodically determining whether an amount of memory that is available is below a threshold;
in response to determining that the amount of memory that is available is below the threshold, terminating the normal loading operation and performing a low-memory loading operation, the low-memory loading operation including (i) continuously loading additional thumbnail items for both sides of the current scroll position while removing one or more loaded thumbnail items from the memory resource that are displayed furthest from the current scroll position, (ii) in response to receiving user input to change the current scroll position, removing loaded thumbnail images that are displayed furthest from the changed current scroll position while loading additional thumbnail items for both sides of the changed current scroll position, and displaying at least some of the thumbnail items as they are loaded into the memory resource, the thumbnail items displayed in a list window that contains at least a portion of the list of thumbnail items.

9. The device of claim 8, wherein the processor presents a user interface feature on the display, the user interface feature including a preview window for displaying a media item that corresponds to a selected thumbnail item.

10. The device of claim 8, wherein the current scroll position comprises an index associated with a thumbnail item in the list.

11. The device of claim 9, wherein the current scroll position identifies a subset of the thumbnail items that are to be displayed in the user interface feature.

12. The device of claim 8, wherein the processor is configured to receive the current scroll position in response to linking to one of the media items.

13. The device of claim 8, wherein the processor is configured to receive the current scroll position as part of state information saved from a previous use by a user.

14. The device of claim 8, wherein each media item comprises an image, and each corresponding thumbnail item comprises a lower resolution thumbnail image that corresponds to the image.

15. A non-transitory computer-readable medium that stores instructions that when executed by one or more processors, cause the one or more processors to perform operations comprising:
allocating a portion of a memory for a list of thumbnail items;
identifying a current scroll position in the list of thumbnail items=
performing a normal loading operation to load at least some of the thumbnail items into the memory, including (i) loading one or more thumbnail items associated with the current scroll position, (ii) continuously loading additional thumbnail items for both sides of the current scroll position in order of their displayed proximity to the current scroll position, so that thumbnail items that are to be displayed closest to the current scroll position are loaded first and thumbnail items that are to be displayed furthest from the current scroll position are loaded last, and (iii) while continuously loading, periodically determining whether an amount of memory that is available is below a threshold;
in response to determining that the amount of memory that is available is below the threshold, terminating the normal loading operation and performing a low-memory loading operation, the low-memory loading operation including (i) continuously loading additional thumbnail items for both sides of the current scroll position while removing one or more loaded thumbnail items from the memory resource that are displayed furthest from the current scroll position, (ii) in response to receiving user input to change the current scroll position, removing loaded thumbnail images that are displayed furthest from the changed current scroll position, while loading additional thumbnail items for both sides of the changed current scroll position; and displaying at least some of the thumbnail items as they are loaded into memory.

16. The computer program product of claim 15, wherein the computer-readable medium further stores instructions for:

displaying a media item that corresponds to a selected thumbnail item in a preview window.

17. The computer program product of claim 15, wherein each media item comprises an image, and each corresponding thumbnail item comprises a lower resolution thumbnail image that corresponds to the image.

18. The computer program product of claim 15, wherein the current scroll position is defined by a window that includes a set of visible thumbnail items.

19. The computer program product of claim 15, wherein the current scroll position is defined by at least one visible item in the list of thumbnail items.

* * * * *